United States Patent [19]

Reiker

[11] E Patent Number: Re. 33,147

[45] Reissued Date of Patent: Jan. 16, 1990

[54] CEILING FAN MOUNTING ASSEMBLY

[76] Inventor: Kenneth H. Reiker, 22 Lakeshore Dr., Shalimar, Fla. 32579

[21] Appl. No.: 229,438

[22] Filed: Aug. 8, 1988

Related U.S. Patent Documents

Reissue of:

[64] Patent No.: 4,684,092
Issued: Aug. 4, 1987
Appl. No.: 785,405
Filed: Oct. 8, 1985

[51] Int. Cl.[4] ..... F24F 7/06

[52] U.S. Cl. ..... 248/200.1; 248/57; 248/343

[58] Field of Search ..... 248/200.1, DIG. 6, 342, 248/343, 57; 52/39

[56] References Cited

U.S. PATENT DOCUMENTS

| | | | |
|---|---|---|---|
| 2,374,993 | 5/1945 | Haynes | 248/DIG. 6 X |
| 2,448,001 | 8/1948 | Maurette | 248/343 |
| 4,463,923 | 8/1984 | Reiker | 248/57 X |
| 4,513,940 | 4/1985 | Alperin et al. | 248/343 X |
| 4,513,994 | 4/1985 | Dover et al. | 248/57 X |
| 4,518,141 | 5/1985 | Parkin | 248/57 X |
| 4,538,786 | 9/1985 | Manning | 248/57 X |
| 4,645,158 | 2/1987 | Manning | 248/343 |

*Primary Examiner*—Ramon S. Britts
*Assistant Examiner*—Karen J. Chotkowski
*Attorney, Agent, or Firm*—Shlesinger & Myers

[57] ABSTRACT

A ceiling fan mounting assembly includes a readily installed specially shaped hanger bracket which provides direct high load and torque resistant support for the ceiling fan assembly, as well as providing support for the electrical junction box.

37 Claims, 4 Drawing Sheets

CEILING FAN MOUNTING ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to a fan ceiling support assembly, and particularly to a new type of readily installed high load and high torque resistant assembly.

Mounting of ceiling fans is of particular importance inasmuch as they are sizable devices and the falling of such devices from the ceiling can result in substantial injury to persons struck by them. The support arrangements of the past have been found to be inadequate, and falling fan assemblies have incurred. Rotary ceiling fans have been conventionally installed by supporting the fan assembly on the outlet junction box. The underwriters code has taken notice of this particular situation and has proposed several changes in support arrangements for these ceiling fan units to provide fail safe installation.

For example, in most installations, where the fan assembly has been directly supported by the outlet junction box, the box does not have special provision for supporting such units, and further is of such light construction that it is not possible to provide the high load capability and torque resistant support required for adequate and safe fan assembly installation. Usually, a simply screw fastening for a fan assembly supported by a metal electrical outlet box has been used. The metal tabs on the box, containing only two threads have been relied upon to provide a support for the fan assembly. With pro-longer use of the fan, either vibration or torque load, wear down the threads, or the screw fastener backs out of the threaded tab, and the ceiling fan assembly comes loose.

Fan assemblies have also been supported on a J-hook, which ordinarily would appear to be sufficiently strong to support a fan assembly. However, it has been experienced that after a long period of time the rotational torque, particularly with respect to reversable fans, works the J-hook loose with the resultant falling of the fan assembly.

Plastic or fiberglass boxes have also been used, out due to their lack of strength, failure and consequent falling of the fan assembly has occurred.

In view of these shortcomings of the previous support arrangements, the instant hanger bracket and fan support assembly has been designed to overcome such difficulties.

SUMMARY OF THE INVENTION

Accordingly, this invention contemplates the provision of a high load, high torque resistant support assembly for ceiling fans in which the above-noted shortcomings are overcome.

The hanger bracket assembly of the instant invention provides for a firm support of the fan assembly with provision for completely eliminating failure due to high torque. The independent support of the fan assembly and the electrical box which is provided, is not dependent upon several thin threads, or the thin or light material of the box.

The assembly provided uses a simple hanger bracket which is readily installed and provides a firm immovable support which cannot be worked loose over a period of time, which is possible with fans supported by a J-hook.

In this particular proposed hanger assembly for ceiling fans, a new and safe support is provided and a simple unitary bracket provides for the firm engagement with the joist structure, as well as for providing a quickly installed element for supporting both the high load for the fan and the electrical box.

DESCRIPTION OF THE DRAWINGS

FIG. 5b is a top view of the hanger bracket of FIG. 5a.

DESCRIPTION OF THE INVENTION

Figure 1:
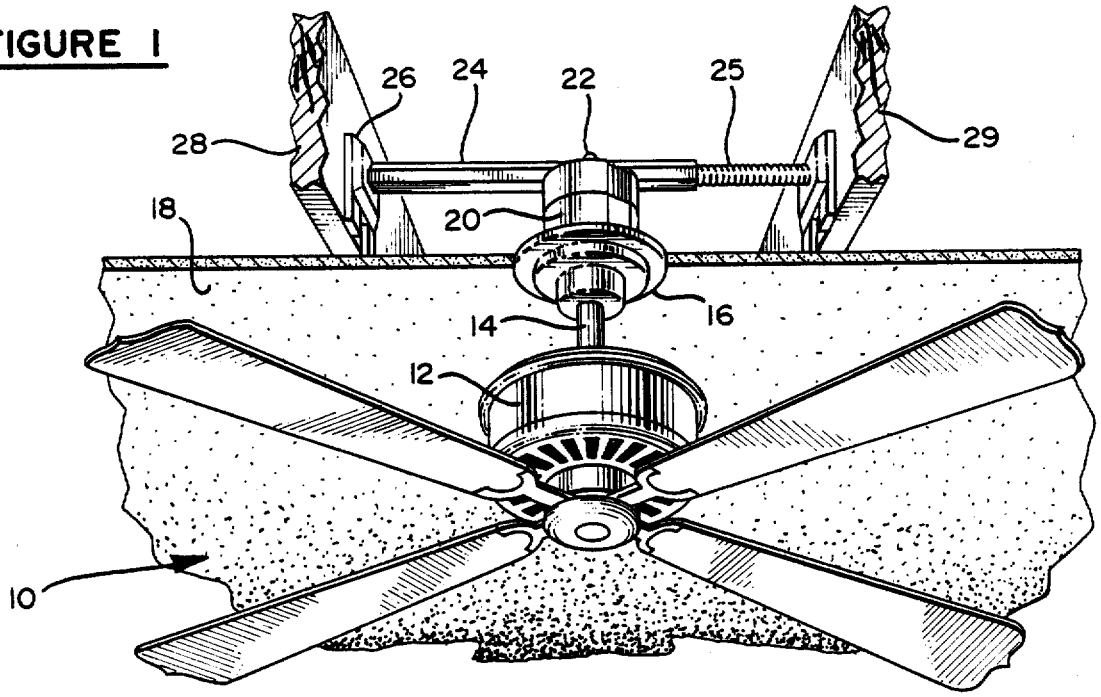
FIG. 1 is a perspective view showing the ceiling fan assembly in position on the ceiling and the ceiling cut away to show the joist and support structure.

Referring in particular to the drawings, and particularly to FIG. 1, the overall assembly of the ceiling fan and its support is shown in this perspective view. The ceiling fan generally indicated at 10 has a housing 12 enclosing the fan and is supported by the support shaft 14 through which the electrical wires for the motor, not shown, are passed. The support assembly of the fan 16 is mounted immediately below the ceiling 18 and passes through an opening therein and is mounted immediately below the electrical outlet box 20. A part of the hanger bracket assembly is shown at 22. The hanger bracket assembly supports both the fan support housing 16 and the electrical junction box 20 independently. It, in turn engages the adjustable flat sided hexagonal bar 24 to provide a rigid and immovable support for the fan assembly.

The adjustable support bar 24 threadedly receives the threaded bar 25, so as to permit expansion of the end support pieces 26 into direct tight pressure engagement with the adjacent joists 28 and 29 which are immediately adjacent the opening through the ceiling 18.

Figure 2A:
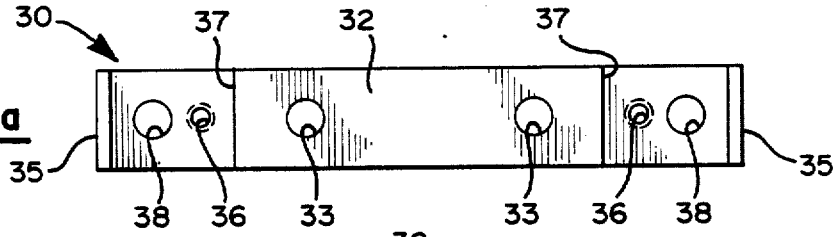
FIG. 2a is a top view of the hanger bracket of the subject invention.
Figure 2B:
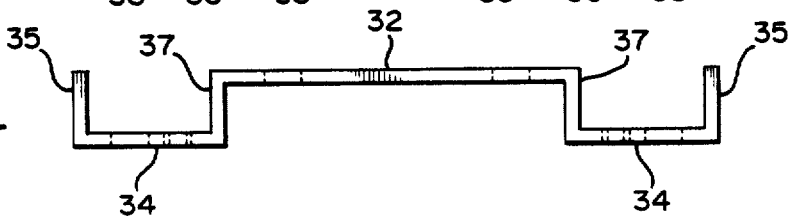
FIG. 2b is a side elevational view of the hanger bracket of FIG. 2.
Figure 3:
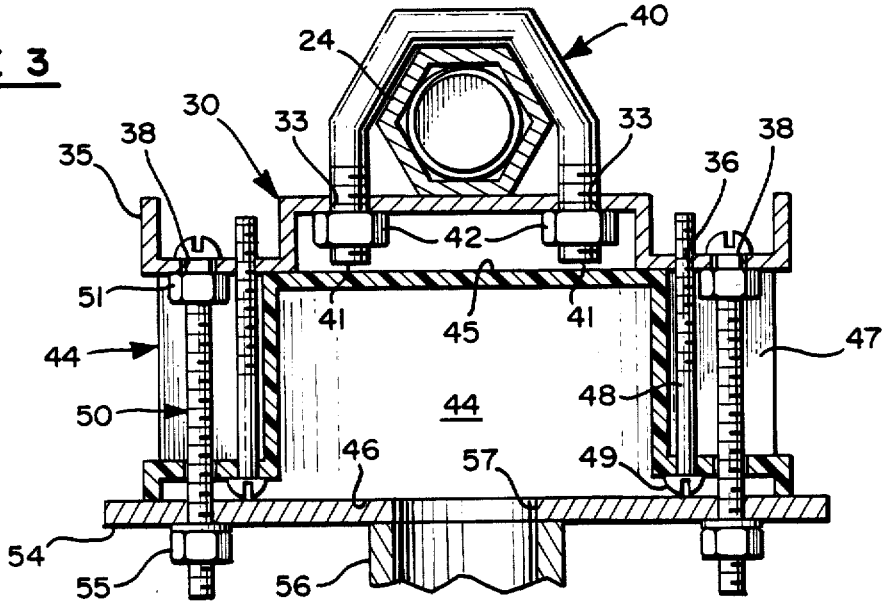
FIG. 3 is a sectional view of the ceiling fan mounting assembly showing a plastic electrical outlet box and part of the ceiling fan support element.

In FIG. 2a and FIG. 2b and FIG. 3, the hanger bracket generally indicated at 30 and the support element generally indicated at 40, are shown in position engaging the hexagonal section support bar 24.

The hanger bracket construction 30 is shown in FIG. 2a and 2b as a central upwardly extending fastener receiving recess section 32. It has support holes 33 for receiving fastener elements as shown in FIG. 3. The height of the recess is sufficient to receive the ends 41 of the U-shaped support bar clamp 40 and the fasteners 42, as shown in FIG. 3.

Outer downwardly extending fastener receiving pockets 34, which have an upwardly extending side flange 35, are disposed adjacent downwardly extending wall 37 to receive the fasteners for the outlet box and the fan assembly. The small tapped hole 36 receives the fastener for the electrical outlet box. The holes 38 receive the downwardly extending threaded support rods 50 which support the fan housing element as shown in FIG. 3.

As shown in FIG. 3, the U-shaped clamp 40 firmly engages the bar 24 and holds the hanger bracket 30 firmly in position against the lower flat side of bar 24 when the nuts 42 are tightened. This provides a firm rigid support for the hanger bracket. The diameter of the U-shaped rod clamp threaded ends is accomodated through the holes 33 which are approximately $\frac{1}{4}$ of an inch so as to support a sufficiently sturdy U-shaped sized member having a diameter of approximately $\frac{1}{4}$ of an inch.

The hanger bracket 30 is approximately $4\frac{1}{4}$ inches in length and is made from 1/16 inch metal stock. Clamp receiving holes 33 are spaced approximately $\frac{1}{2}$ inches apart on center. The hanger bracket is approximately $\frac{5}{8}$ of an inch in width. Outside end members 35 are approximately $\frac{1}{2}$ inch in length. The rod receiving holes 38 are sufficiently wide to accomodate a $\frac{1}{4}$ inch bolt which is the threaded down rod support element 50 for the ceiling fan assembly.

The tapped screw holes 36 are substantially smaller, and accomodate a long small diameter machine 48 for holding the plastic box 44 in position as shown in FIG. 3. Note that the head 49 of the rod 48 holds the box 44 such that its top surface 45 at its edges engages the bottom of the outer recess section 34 of the hanger bracket 30 in firm engagement, and that the central recess 32 provides ample clearance from the outlet box top surface 45 for the free ends 41 of clamp 40 and the nuts 42.

The junction box 44 has an outer channel 47 in which the metal screws 48 and the depending threaded down rod ceiling fan assembly support bolt 50 extend, exteriorly of the interior of the box 44.

The bolts 50 acting as the support elements for the ceiling fan assembly are held in position on the bracket 30 by the lock nuts 41 and provide a spaced pair of support elements which will reduce torque and twist while the head of the bolts provides a firm load capability.

The bolts 50 extend downwardly through the plate 54 which is held in position firmly against the lower periphery 46 of the junction box 44 when the lock nuts 55 are tightened. The hollow support shaft 56 is equivalent, or the same as, the shaft 14 of FIG. 1. With this arrangement the support bracket 30 is securely held to the traverse joist engaging bar 24 and also provides a separate support for the fan assembly independent of the electrical box. In addition, the simple fastening arrangement shown can be used for both the outlet box and the ceiling fan assembly itself such that the ceiling fan is rigidly supported against the lower periphery of the box, which in turn is in solid flat engagement with the bottom surface of the bracket 30.

Figure 4:
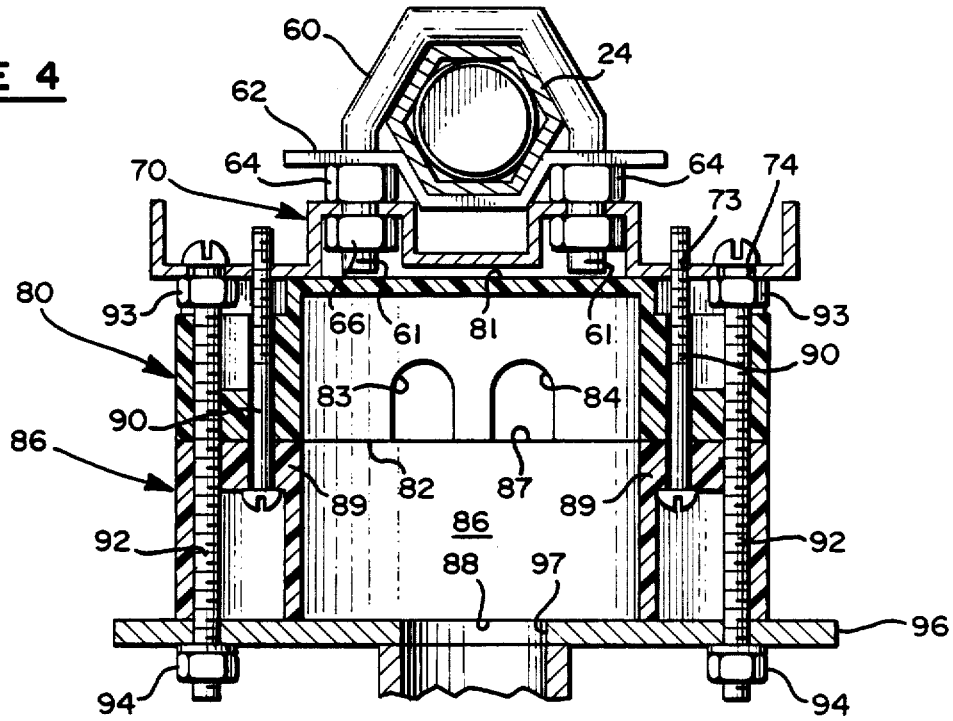
FIG. 4 is a side sectional view of another hanger bracket assembly showing a two-piece outlet box and a part of the ceiling fan support structure.

FIG. 4 shows another type of hanger bracket arrangement using a different hanger arrangement and showing a two piece electrical outlet box 80.

The U-shaped clamp 60 is of the same configuration as that of FIG. 3, having threaded free ends 61 which extend through openings in a particularly configured engaging plate 62 for engaging several flat surfaces of the hexagonal support bar 24. The U-shaped clamp 60 is fastened on the bar and held in position by the nuts 64. The hanger bracket 70 is then mounted over the free ends 61 and held in position by the two lock nuts 66.

Figure 5A:
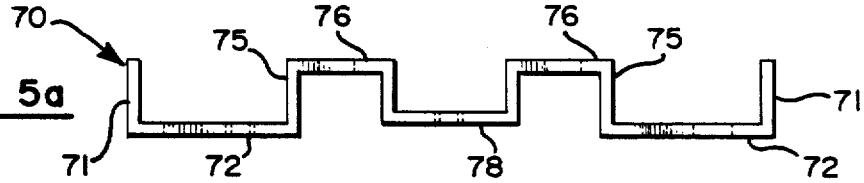
FIG. 5a is a side view of the hanger bracket illustrated in FIG. 4.
Figure 5B:
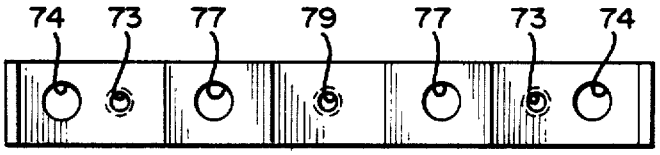

FIGS. 5a and 5b show the detailed construction of the hanger bracket 70 which has upwardly extending flanges 71, downwardly extending fastener recess pockets 72, and upwardly extending fastener recesses 76. The tapped fastener receiving openings 73, the down rod ceiling fan support openings 74, and the fastener support holes 77 all correspond to those of hanger bracket 30. A lower central depending section 78 has a tapped hole 79 which can be used for accomodating a single fastener support for an outlet box.

With respect to the outlet box of FIG. 4, it should be noted that it has an upper section 80 with an upper top wall 81 which engages the lower surface of the hanger bracket 70. It is distinctive in that adjacent its lower surface there are two slots 83 and 84 to accomodate electrical cable. It is possible with this type of box construction to merely press the cable into the elongated slot, rather than pulling the cable ends through a hole as in conventional boxes. This provides for more readily installed electrical wiring for the fan itself. The lower section 86 of the outlet box is similar and of matched construction with respect to the end section and has an upper surface 87 along its periphery which closes the open ends of the slots 83 and 84 to hold the wires in position. It has an outwardly extending boss 89 through which fasteners 90 extend upwardly and through the tapped openings 73 of hanger bracket 70 to hold the composite box construction in position.

Downwardly extending bolts 92 pass through openings 74 and are bolted in fixed position by nuts 93 so as to provide firm threaded downwardly extending ceiling fan assembly support rods. The ceiling fan support plate 96 is held in position against the lower periphery of the lower surface 88 of lower section 86 of the two piece box assembly. Wires pass down through the opening 97 in plate 96 to the ceiling fan itself. Luck nuts 94 hold plate 96 firmly in position to provide a high load and high torque resistant support due to the two widely spaced support elements 92 which resist torque and eliminate the problem of unscrewing of fastenings due to rotational twist of the entire assembly, previously encountered with former central support elements such as the J-hook.

Figure 6:
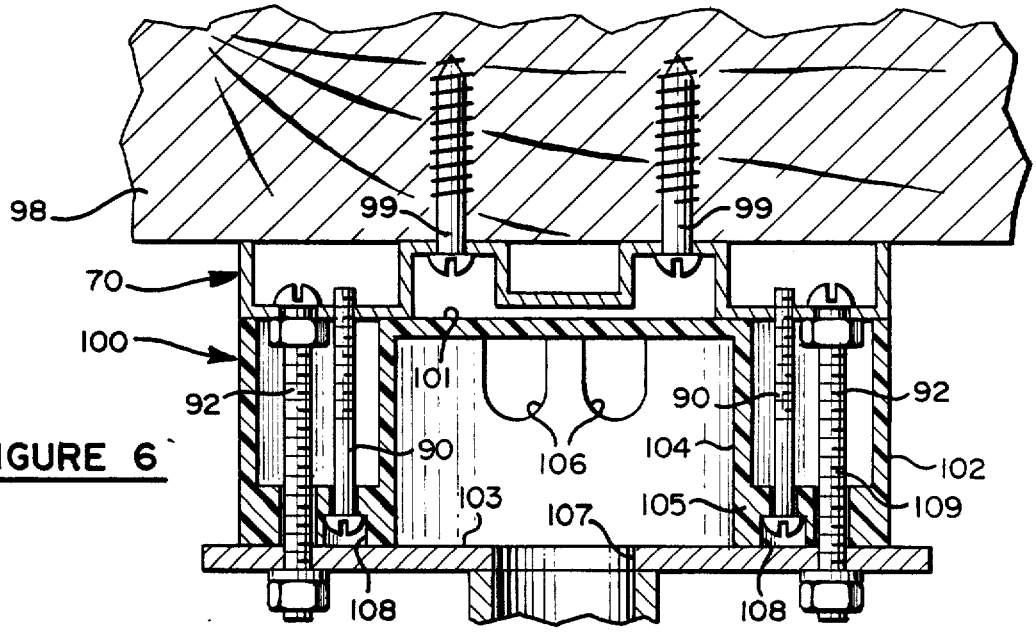
FIG. 6 is a side section view showing the hanger bracket of FIGS. 5a and 5b in direct fastening engagement with a ceiling joist, and supporting a fiberglass junction box.

FIG. 6 discloses an arrangement in which the hanger bracket 70 is directly secured to the ceiling joist 98, rather than to a cross bar such as the bar 24 previously shown. Wood screws 99 hold the hanger bracket 70 in position. Note, that as well as the central outstanding sections 76, the exterior flanges 71 also engage the lower surface of the joist to provide a firm unyielding support against which the junction box 100 can rest. The junction box shown is plastic or of fiberglass construction, and has an upper surface 101 which firmly rests against the hanger bracket. The outer periphery 102 encloses a central well section defined by an internal wall 106 to provide two diametrically opposed open shafts exteriorly of the internal portion of the box through which the box retaining fasteners 90 can extend as well as the ceiling fan retaining bolts 92. The lower end of the passages are closed at 105. The fastener 90 is fitted into the recess 108 such that the head of the metal screw 90 is provided with a shoulder against which it rests.

Figure 7:
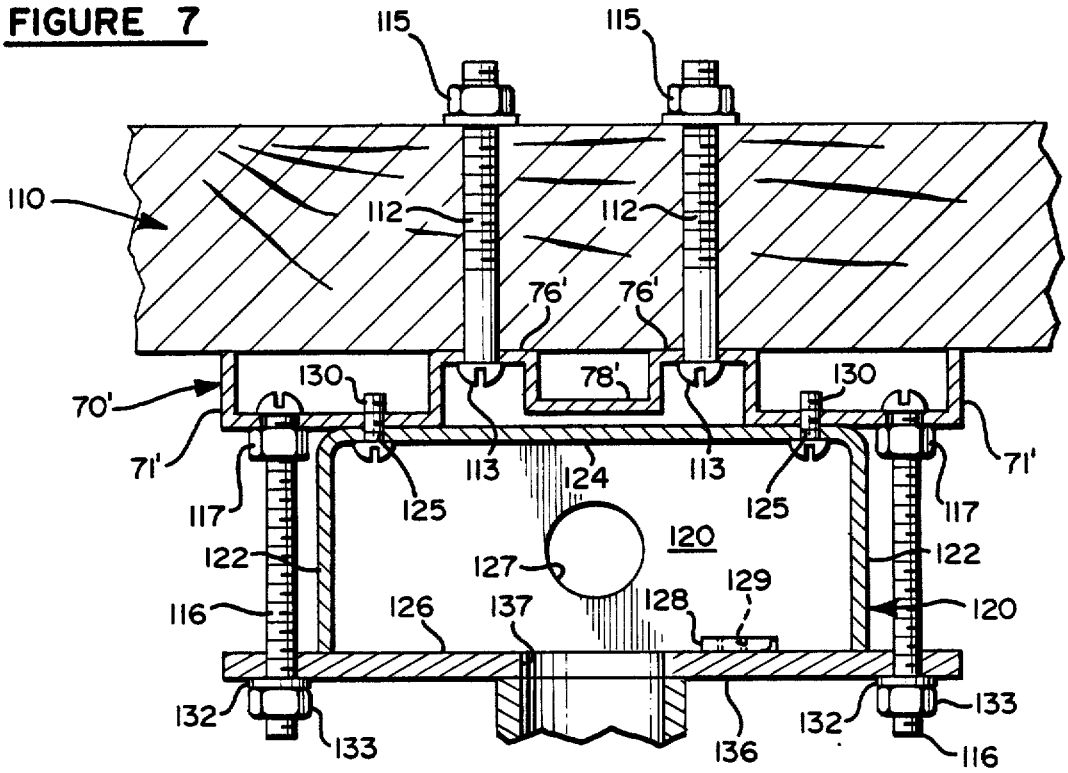
FIG. 7 is a side section view of the hanger bracket of FIG. 5 shown fastened to a ceiling joist and supporting a metal electrical outlet box.

FIG. 7 shows the hanger bracket 70, as might be used as bolted to a cross piece, or 2×4 member 110 to which the bracket 70 is held in position by the bolts 112. They extend through the 2×4 and are in engagement with the upper sections 76 of the bracket 70 to hold the bracket in position by the heads 113 when the lock nuts 115 are tightened. This figure shows the fastening arrangement for the conventional type of metal outlet electrical box 120. The bracket 70' corresponds to bracket 70, except that it is much to provide a wider span for the depending support elements 116. They are held in position by the nuts 117 and extend downwardly along side the outer periphery 122 of the outlet box 120. The upper surface of the outlet box 124 is held in position up against the lower portion of the hanger bracket 70' by threaded metal screws 130 which extend through openings 125 in the upper surface of the metal outlet box. The opening 127 provides the access to the interior of the box for electrical cable. The lower periphery of the box 126 in line with inwardly extending metal tabs 128 which have a threaded tab opening 129. These tabs 128 have a threaded tapped opening 129. These tabs 128 have been used in the past to support hanger assemblies and have failed under load and torque conditions, since only two threads are possible in the tapped opening 129. These threads are not sufficiently strong to securely hold the fan assembly for long periods of time under conditions of vibration and fatigue.

Figure 8A:
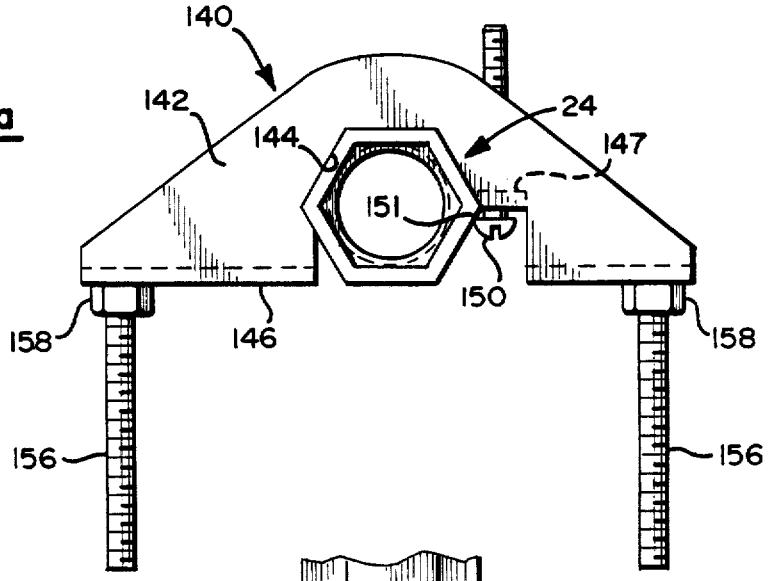
FIG. 8a discloses a hanger bracket element particularly configured to engage the hexagonal support bar.
Figure 8B:
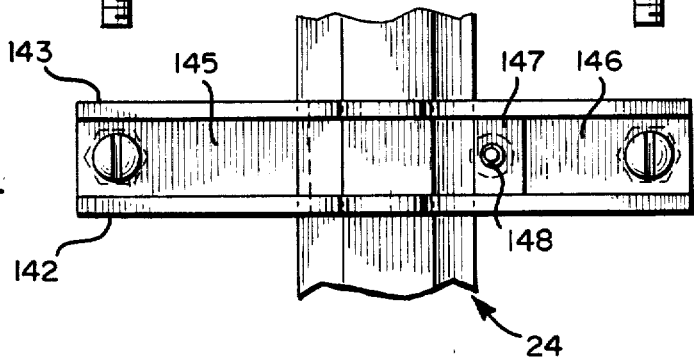
FIG. 8b is a top view of the support bar engaging element of FIG. 8.

As seen in this figure, these tabs are now not used, but rather, the downwardly extending threaded bolts 116, which extend through the upper retaining plate 136 of the fan support assembly. The plate is held in position by the lock washer and lock nut 133 on each of the two depending bolts 116 in firm flat engagement against the lower surface 126 of the box 120. The electrical cable passes downwardly through the opening 137 and the depending hollow shaft to the fan assembly. FIGS. 8a and 8b show another type of ceiling fan support assembly arrangement having a high torque and high load capability. This is a one piece rod engaging bracket assembly generally indicated at 140 having upwardly extending side flanges 142. The central section of which has a shaped recess 144 to accurately engage the flat surfaces of the cross bar 24. It is held in firm engagement with the cross bar 24 by the lock nut 150 which extends through the tapped opening 148 in the lock recess section 147. The head 151 of the lock screw 150 engages the side of the bar 24 to hold the torque stabilizing unit in firm engagement with the bar 24.

Downwardly extending threaded ceiling fan support rods 156 extend through openings in the lower surface 145 and are held in position by the lock nut 158. The lower periphery 146 of this central lower section 145 have tapped openings not shown for supporting the electrical outlet junction box in the manner disclosed above with the hanger brackets.

Figure 9:
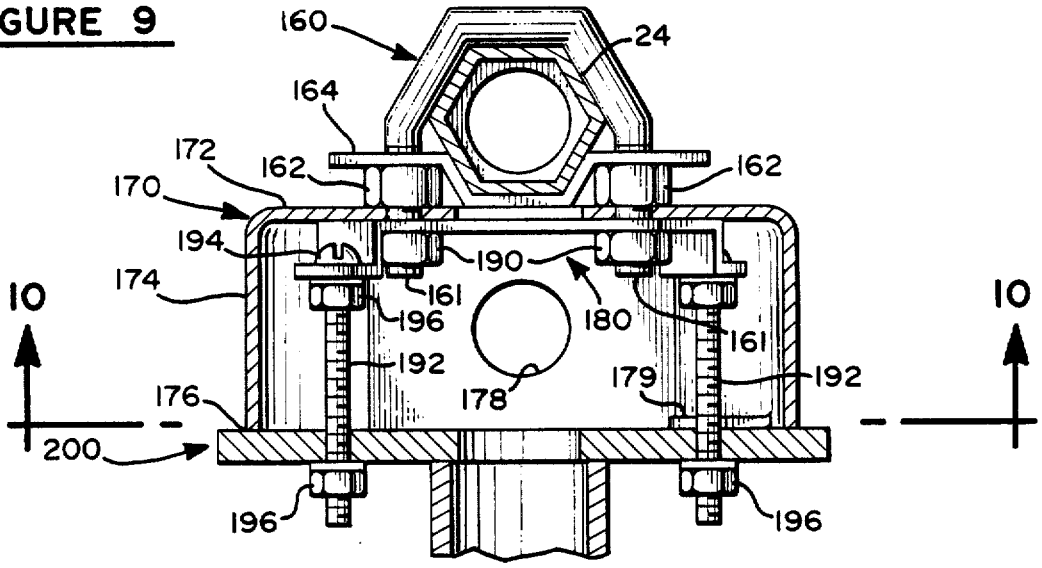
FIG. 9 is a side section view showing a hanger bracket modification for supporting the junction box from the inside thereof.

FIG. 9 discloses an arrangement for supporting the junction box with a hanger bracket disposed within the junction box itself.

The U-shaped mounting element 160 is disposed over the support bar 24 as indicated in FIG. 9 and has a free end 161 which are threaded to receive locking fasteners 162 which hold the strap-like securing member 164 in firm engagement with the cross bar 24 to provide a high load and non-twistable connection assembly.

The junction box, generally indicated at 170, has an upper surface 172 which has two openings 173 through which the free ends 161 of the U-shaped support member 160 pass.

Figure 10:
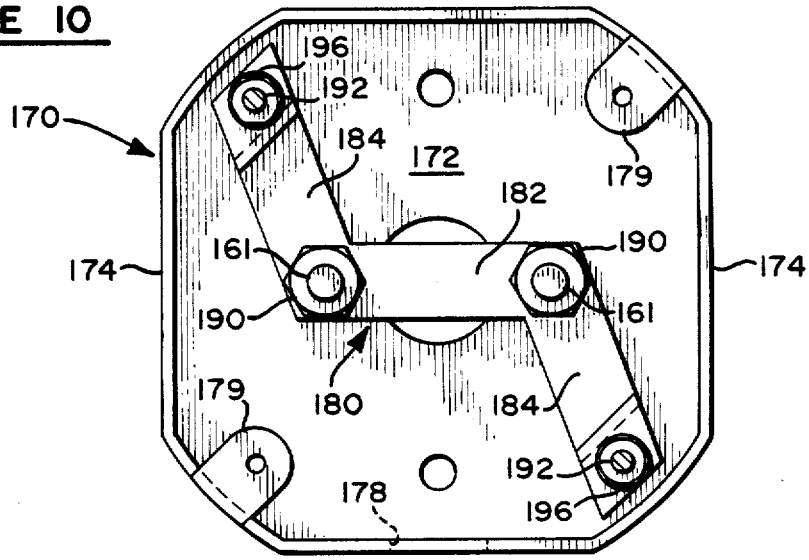
FIG. 10 is a sectional view taken along line 10—10 of FIG. 9.

The junction box as seen in FIGS. 9 and 10 is made of metal and is a conventional electrical outlet box having downwardly extending walls 174 which a lower periphery 176. A knock-out cable receiving opening 178 is shown in FIG. 9. The junction box has two diagonally spaced bent tabs 179 along the lower periphery 176 which have threaded openings therein to accomodate electrical fastening elements.

Figure 11:
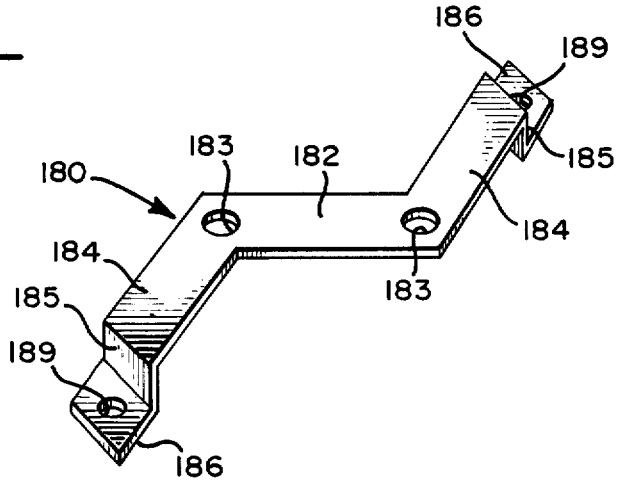
FIG. 11 is a perspective view of the modified hanger bracket.

The hanger bracket 180 as seen in a perspective view of FIG. 11 has a central section containing fastener receiving openings 183. The extremities of the hanger bracket 180 have diagonally extending elements 184. The outer extremities of sections 184 have a downwardly extending flange 185 and an outwardly extending piece 186 with fastener support receiving openings 189 for the fan support assembly elements.

Referring to FIG. 9 and 10, it will be seen that the hanger bracket 180 is held in position by lock nuts 190 which are disposed on the free lower ends 161 of the U-shaped support member 160.

The threaded support bolt 192 extends through the openings 189 of the hanger bracket 180 and is held in position by lock nuts 196 which bring the bolt heads 194 into firm locking engagement with the end pieces 186 of the hanger bracket 180.

The lower end of the bolts 192 extend through openings in a ceiling fan support plate 200 and are held in position by the two lock nuts 196 which are threaded onto the lower end of the bolts 192 to provide a firm rigid connection.

It will be noted that the junction box 170 is held in firm immovable contact with the cross member 24 of the joist engaging assembly, and that the ceiling fan support piece 200 is brought into firm secure engagement with the lower periphery 176 of the junction box 170 when nuts 196 are tightened on the support bolts 192, the latter of which are held in firm position on the hanger bracket 180, the latter being firmly held in engagement under the junction box and with the U-shaped supporting member 160 by lock nuts 190.

It should be noted that the ceiling fan assembly support bolts 192 are spaced apart the same distance as the openings in the bent tabs 179 of the junction box 170. This spacing is 3½ inches center to center. The hanger bracket 180 provides depending strong support elements with this spacing. This permits the bracket to provide a strong support assembly as a substitute for the prior use of the threaded openings in the tabs 179 without modification of the fan assembly support. This dimension is also maintained with the other hanger brackets which extend outside the box. It will be noted that these brackets instead of extending diagonally across the box extend laterally across the box and the depending support bolts extending outside the box also have the 3½ inch length between them.

The use of the hanger bracket provides a strong support, as can be seen in FIG. 9, as well as in the other figures, in that the head of the bolt 194 provides the vertical support, rather than the end threaded connection previously relied on in which the fragile thin threads tapped into the thin tabs 79 were relied on.

Accordingly, the use of the hanger bracket and support elements shown provide a sturdy, unyieldable support arrangement for ceiling fans which can readily be installed.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. A ceiling fan mounting assembly for providing a high load capability, vibration resistant, and torque resistant connection through a ceiling opening between an electrical ceiling fan support housing and a joist structure adjacent the opening, comprising:

(a) hanger bracket assembly means engaging the joist structure and providing rigid support between the joist structure and a ceiling fan assembly support housing, (b) the hanger bracket assembly means including two widely spaced downwardly extending support elements rigidly supported at their upper end, which extend through a ceiling opening and directly support the ceiling fan support housing, (c) an electrical junction box having a relatively flat upper surface and a lower peripheral surface, positioned immediately below the hanger bracket assembly means with at least two diametrically opposed sections of said upper surface rigidly engaging the hanger bracket assembly means, (d) a ceiling fan support housing having a structural member which is disposed directly below and in firm engagement with the lower surface of the junction box, (e) a ceiling fan support housing structural member having retaining sections with openings therein, (f) said support elements extending along the outside of the internal periphery of the junction box and through the openings of the retaining sections, (g) fastening means for engaging the lower end of the downwardly extending elongated support elements for holding the ceiling fan support housing in firm contact against the junction box whereby the junction box is pressed into firm engagement against the hanger bracket assembly means and acts as a firm intermediate support element for the ceiling fan assembly support housing.

2. The ceiling fan mounting assembly as set forth in claim 1, wherein:

(a) the hanger bracket means includes a horizontal support rod extending between the joist structure and a generally U-shaped member which extends over and around the horizontal support rod and has a fastening element on each of its lower free ends.

3. The ceiling fan mounting assembly as set forth in claim 1, wherein:

(a) the hanger bracket means includes a horizontally disposed hanger bracket with a central upwardly extending fastener receiving recess section, and (b) the upper middle surface of the central section provides a flat engaging surface to permit rigid engagement with a supporting flat surface.

4. The ceiling fan mounting assembly as set forth in claim 3, wherein:

(a) the hanger bracket means includes an elongated flat strip of metal having two outer downwardly extending fastener receiving recess sections at each end thereof for receiving the ceiling fan support elements.

5. The ceiling fan mounting assembly as set forth in claim 3, wherein:

(a) the hanger bracket means has outer sections which have an upwardly extending flange for engaging the support surface associated with the joist structure.

6. The ceiling fan mounting assembly as set forth in claim 3, wherein:

(a) the hanger bracket means has an end recess section and its outer end thereof provides a lower surface against which the upper surface of the function box rests, and which is sufficiently downwardly displaced to provide clearance for the fastening means disposed in the fastener receiving recess section of the bracket so as to avoid contact with the upper surface of the junction box.

7. The ceiling fan mounting assembly as set forth in claim 6, wherein:

(a) each outer end of the hanger bracket means is integrally connected at one end thereof to one of the elongated downwardly extending support element.

8. The ceiling fan mounting assembly as set forth in claim 3, wherein:

(a) the hanger bracket means is an elongated piece of metal with a central upwardly recessed fastener receiving section, and two adjacent outer downwardly extending recess sections, and (b) the recess sections being in direct lateral alignment with each other and of substantially the same depth to provide recessed areas for fastening elements with sufficient clearance at the hanger bracket means so its outer upper surface can contact and firmly engage the support surface can contact and firmly engage the support surface and the lower surface of the outer extremedies can provide support for a junction box.

9. The ceiling fan mounting assembly as set forth in claim 3, wherein:

(a) the hanger bracket means is an integral single piece including a connecting element which is shaped to engage the supported rod, and the fastening means which engages the downwardly elongated support elements includes a lock nut which engages the support rod to hold the hanger bracket means in position.

10. The ceiling fan mounting assembly as set forth in claim 1 wherein:

(a) the junction box is a two-piece assembly having upper and lower sections which meet along a common horizontal line, and (b) at least one of the sections of the junction box having a plurality of open electrical cable receiving slots extending from the common line to permit cable to be directly pressed into the cable slots, and the opening subsequently closed when the lower section of the box is mounted in position along the common line.

11. The ceiling fan mounting assembly as set forth in claim 3, wherein:

(a) the hanger bracket means is directly fastened to a joist passing directly over the ceiling outlet opening by a plurality of wood screws, and (b) the hanger bracket means being an elongated thin piece of metal having fastener receiving openings through the upper section of the hanger bracket through which the wood screws are received.

12. The ceiling fan mounting assembly as set forth in claim 3, wherein:

(a) the hanger bracket means is an elongated piece of metal having a central section with fastener openings, and (b) an outer support section adjacent each end thereof contains the upper section of the downwardly extending support elements.

13. The ceiling fan mounting assembly as set forth in claim 1 wherein:

(a) the junction box is a plastic structure which has an outer channel through which the downwardly extending support elements extend.

14. The ceiling fan mounting assembly as set forth in claim 1, wherein:

(a) fastener means extends through the junction box for independently connecting it to the hanger bracket assembly means.

15. A ceiling fan mounting assembly for providing a high load capability, vibration resistant, and torque resistant connection through a ceiling opening between an electrical ceiling fan support housing and the joist structure adjacent the opening, comprising:

(a) hanger bracket assembly means engaging the joist structure and providing rigid support between the joist structure and a ceiling fan assembly support housing, (b) an electrical junction box having a relatively flat upper surface and a downwardly extending side wall positioned immediately below the hanger bracket assembly means, the side wall having a lower peripheral surface displsed immediately below the hanger bracket assembly means, (c) two spaced diametrically disposed elongated downwardly extending parallel bolts which are disposed close to and extend below the side wall, (d) a horizontal metal plate support element with openings therethrough connected to the hanger bracket assembly whereby the bolts adjacent their upper end pass through the openings.

(e) each bolt having a head which engages a top surface of the support section and a lock nut which engages the underside of said section whereby the bolts are rigidly held in fixed position with respect to the section to provide a rigid immovable load carrying support element, (f) a ceiling fan support housing have a structural member which is disposed directly below and in firm surface engagement with the lower periphery of the junction box, (g) the structural member having retaining sections with openings therein through which the lower ends of the bolts extend, and (h) fastening elements which are fitted on the lower end of the bolts and engage the lower surface a retaining section of the structural member to hold the ceiling fan support housing in a firm contact against the junction box to thereby provide a rigid unified fan support structure which is vibration-free and is torque and twist resistant.

16. The ceiling fan mounting assembly as set forth in claim 15, wherein:

(a) the hanger bracket assembly includes a horizontally extending support member having a flat sided surface, (b) a connecting clamp which immovably engages the flat surface and has two spaced downwardly extending threaded elements which receive a fastening elment and provide firm immovable support to the depending bolts and the junction box.

*17. A ceiling fan mounting assembly providing high load capability, and vibration and torque resistance for an electrical ceiling fan support housing connected with a joist structure adjacent an opening in the ceiling, the assembly comprising:*

*(a) means for engaging the joist structure adjacent the ceiling opening and for providing a firm, torque resistant support structure above the ceiling opening;*

*(b) an electrical junction box having a relatively flat upper surface and side wall structure with a lower peripheral surface, said junction box in firm engagement with said joist engaging means for providing vibration and torque resistance;*

*(c) two widely spaced support elements operably associated with said box and extending downwardly therefrom substantially parallel to said side wall structure and terminating substantially below said peripheral surface;*

*(d) a ceiling fan supporting housing having a structural member disposed below and in firm engagement with said junction box lower peripheral surface, said structural member having a pair of widely spaced openings therein;*

*(e) said support elements extending through said openings and having an upper portion disposed above said upper surface; and,*

*(f) fastening means are mounted on the terminal end of each support element for maintaining said supporting housing structural member in firm engagement with said peripheral surface and for thereby providing vibration and torque resistance.*

*18. The assembly of claim 17, wherein:*

*(a) each of said support elements has a threaded lower end portion; and,*

*(b) each fastening means includes a lock nut.*

*19. The assembly of claim 18, wherein:*

*(a) a pair of widely spaced apertures are operably associated with said side wall structure; and,*

*(b) each of said support elements extends through an associated one of said apertures.*

*20. The assembly of claim 19, wherein:*

*(a) each of said apertures terminates on a plane coincident with said lower peripheral surface.*

21. The assembly of claim 17, wherein:

*(a) each of said support elements is disposed proximate to and interior of said side wall structure.*

*22. The assembly of claim 21, wherein:*

*(a) each of said support elements has an upper portion disposed above said upper surface.*

*23. The assembly of claim 22, wherein:*

(a) each upper portion includes means cooperating with and supported by said joist engaging means.

24. The assembly of claim 23, wherein:

(a) each support element includes a threaded bolt having a bolt head, said bolt head cooperating with and supported by said joist engaging means.

25. The assembly of claim 17, wherein said joist engaging means includes:

(a) a hanger bracket assembly operably secured to the joist structure for providing vibration and torque resistance; and, (b) means extending from said assembly and engaged with said box for securing said box to said assembly.

26. The assembly of claim 25, wherein:

(a) said support elements include means for extending.

27. The assembly of claim 26, wherein:

(a) each support element includes a bolt means having head means and a threaded lower portion; and, (b) each head means is carried by and supported by said assembly.

28. The assembly of claim 17, wherein said joist engaging means includes:

(a) a hanger assembly extending between two adjacently disposed joists;

(b) a hanger bracket assembly operably supported by said hanger assembly for torque and vibration resistance; and, (c) means extend from said hanger bracket assembly for securing said box thereto in a torque and vibration resistant manner.

29. The assembly of claim 28, wherein:

(a) said hanger assembly is extensible along a first axis extending generally transverse to the joists; and, (b) said hanger bracket assembly extends generally transverse to said first axis and parallel to the joists.

30. The assembly of claim 29, wherein:

(a) said means for securing includes said support elements.

31. The assembly of claim 30, wherein:

(a) each of said support elements includes bolt means having a threaded portion and a head means; and, (b) each head means is carried and supported by said hanger bracket assembly.

32. The assembly of claim 28, wherein:

(a) said hanger bracket assembly includes a flat portion carried by and disposed above said hanger assembly.

33. The assembly of claim 28, wherein:

(a) said hanger bracket assembly includes first and second laterally spaced portions extending from and generally transverse to an intermediate portion;

(b) an aperture is disposed in said intermediate portion; and, (c) said means for securing extend through said aperture.

34. The assembly of claim 32, wherein:

(a) said hanger assembly is polygonal in cross section so that said flat portion seats thereon; and, (b) said box is comprised of plastic.

35. A ceiling fan mounting assembly providing high load capability, and vibration and torque resistance for an electrical ceiling fan support housing connected with a joist structure adjacent an opening in the ceiling, the assembly comprising:

(a) means for engaging the joist structure adjacent the ceiling opening and for providing a firm, torque resistant support structure above the ceiling opening;

(b) an electrical junction box having a relatively flat upper surface and side wall structure with a lower peripheral surface, said junction box in firm engagement with said joist engaging means for providing vibration and torque resistance;

(c) two widely spaced support elements operably associated with said box and extending downwardly therefrom substantially parallel to said side wall structure and terminating substantially below said peripheral surface;

(d) a ceiling fan supporting housing having a structural member disposed below and in firm engagement with said junction box lower peripheral surface, said structural member having a pair of widely spaced openings therein;

(e) said support elements having a support structure disposed above the lower periphery of the box for supporting the elements in fixed and immovable position, said support elements extending down through said widely spaced openings; and, (f) fastening means are mounted on the terminal end of each support element for maintaining said supporting housing structural member in firm engagement with said peripheral surface and for thereby providing vibration and torque resistance.

36. The ceiling fan mounting assembly as set forth in claim 35, wherein:

(a) the support structure includes an integral outwardly extending section at the upper end of each support element which is held in tight friction engagement with its adjacent surface.

37. The ceiling fan mounting assembly as set forth in claim 35, wherein:

(a) the support elements also support the junction box.

* * * * *